(12) United States Patent
Ishimatsu

(10) Patent No.: US 9,121,377 B2
(45) Date of Patent: Sep. 1, 2015

(54) CONTROL DEVICE AND CONTROL METHOD FOR INTERNAL COMBUSTION ENGINE

(71) Applicant: Kenichi Ishimatsu, Toyota (JP)

(72) Inventor: Kenichi Ishimatsu, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 358 days.

(21) Appl. No.: 13/771,574

(22) Filed: Feb. 20, 2013

(65) Prior Publication Data

US 2013/0228154 A1 Sep. 5, 2013

(30) Foreign Application Priority Data

Mar. 2, 2012 (JP) ................. 2012-046485

(51) Int. Cl.
| | |
|---|---|
| *F02M 51/00* | (2006.01) |
| *F02D 11/10* | (2006.01) |
| *F02D 41/00* | (2006.01) |
| *F02D 41/04* | (2006.01) |
| *F02D 19/06* | (2006.01) |
| *F02D 31/00* | (2006.01) |
| *F02D 41/06* | (2006.01) |

(52) U.S. Cl.
CPC ........... *F02M 51/00* (2013.01); *F02D 19/0649* (2013.01); *F02D 19/0655* (2013.01); *F02D 31/003* (2013.01); *F02D 41/0025* (2013.01); *F02D 41/047* (2013.01); *F02D 41/064* (2013.01); *F02D 2200/021* (2013.01); *Y02T 10/36* (2013.01)

(58) Field of Classification Search
CPC ... F02D 31/003; F02D 19/0655; F02D 13/06; F02D 19/084; F02D 19/087; F02D 41/222; F02D 37/02; F02D 11/105; F02M 51/00; F02M 25/0228; Y02T 10/32; Y02T 10/36
USPC ............. 123/1 A, 27 GE, 319, 339.1, 339.15, 123/339.22, 339.2, 438, 198 D, 198 DB, 123/198 F, 525–527; 701/110, 112
See application file for complete search history.

(56) References Cited

U.S. PATENT DOCUMENTS

| | | | | |
|---|---|---|---|---|
| 4,244,336 | A | * | 1/1981 | Fitzner ..................... 123/406.57 |
| 4,967,714 | A | | 11/1990 | Inoue |
| 5,190,001 | A | | 3/1993 | Dieter et al. |
| 5,357,927 | A | * | 10/1994 | Saito et al. ............... 123/406.54 |
| 2004/0149247 | A1 | * | 8/2004 | Kataoka et al. ............ 123/179.4 |

(Continued)

FOREIGN PATENT DOCUMENTS

| | | |
|---|---|---|
| JP | 02-086935 A | 3/1990 |
| JP | 02-185634 A | 7/1990 |

(Continued)

*Primary Examiner* — John Kwon
*Assistant Examiner* — Johnny H Hoang
(74) *Attorney, Agent, or Firm* — Gifford, Krass, Sprinkle, Anderson & Citkowski, P.C.

(57) ABSTRACT

It is determined whether a first condition that a temperature of an internal combustion engine is lower than or equal to a predetermined value and an alcohol concentration of fuel is higher than or equal to a predetermined value is satisfied and whether a second condition that indicates that a probability that the internal combustion engine stalls is lower than or equal to a predetermined level is satisfied. When both the first and second conditions are satisfied, control over an intake air amount is limited; whereas, when at least one of the first and second conditions is not satisfied, control over the intake air amount is not limited.

6 Claims, 7 Drawing Sheets

(56) References Cited

U.S. PATENT DOCUMENTS

| | | | |
|---|---|---|---|
| 2007/0119414 A1* | 5/2007 | Leone et al. | 123/295 |
| 2007/0119425 A1* | 5/2007 | Lewis et al. | 123/478 |
| 2008/0314349 A1* | 12/2008 | Oertel et al. | 123/179.5 |
| 2009/0037073 A1* | 2/2009 | Jung et al. | 701/101 |
| 2009/0099753 A1 | 4/2009 | Kaneko | |
| 2009/0112443 A1 | 4/2009 | Kawamura et al. | |
| 2010/0312459 A1* | 12/2010 | Utsumi | 701/106 |
| 2011/0087394 A1* | 4/2011 | Shimanaka | 701/22 |
| 2011/0256981 A1* | 10/2011 | Saito et al. | 477/183 |

FOREIGN PATENT DOCUMENTS

| | | |
|---|---|---|
| JP | 04-128525 A | 4/1992 |
| JP | 06-025528 U1 | 4/1994 |
| JP | 06-129280 A | 5/1994 |
| JP | 07-027004 A | 1/1995 |
| JP | 08-158912 A | 6/1996 |
| JP | 2000-320374 A | 11/2000 |
| JP | 2002-147271 A | 5/2002 |
| JP | 2007-056730 A | 3/2007 |
| JP | 2009-024496 A | 2/2009 |
| JP | 2009-103113 A | 5/2009 |
| JP | 2009-133245 A | 6/2009 |
| JP | 2010-014061 A | 1/2010 |
| JP | 2010-048098 A | 3/2010 |
| JP | 2011-144721 A | 7/2011 |
| JP | 2012-013005 A | 1/2012 |

* cited by examiner

CONTROL DEVICE AND CONTROL METHOD FOR INTERNAL COMBUSTION ENGINE

INCORPORATION BY REFERENCE

The disclosure of Japanese Patent Application No. 2012-046485 filed on Mar. 2, 2012 including the specification, drawings and abstract is incorporated herein by reference in its entirety.

BACKGROUND OF THE INVENTION

1. Field of the Invention

The invention relates to control over an idle rotation speed (hereinafter, simply referred to as ISC) in an internal combustion engine and, more particularly, to ISC in a cold state of a flexible fuel internal combustion engine that is able to use alcohol-containing fuel.

2. Description of Related Art

In an existing art, generally in an internal combustion engine for an automobile, or the like, ISC is executed. In ISC, an engine rotation speed during idle operation (idle rotation speed) is fed back, and an intake air amount and a fuel supply amount are controlled such that the idle rotation speed converges to a target rotation speed. The target rotation speed is basically set on the basis of an engine coolant temperature, a vehicle speed, and the like, and, when the engine is in a cold state or an air conditioner is operating, the target rotation speed is controlled to a relatively high value. Thus, an engine stop that is not intended by a driver (so-called engine stalling) is prevented (for example, see paragraphs 0047 and 0048 in Japanese Patent Application Publication No. 2010-14061 (JP 2010-14061 A)).

Incidentally, in recent years, not only gasoline or light oil but also fuel that contains alcohol (such as methanol and ethanol) may be used as fuel in an internal combustion engine of an automobile, or the like. This is described at paragraph 0015 in JP 2010-14061 A. A vehicle on which an internal combustion engine that uses alcohol-containing fuel (hereinafter, referred to as flexible fuel internal combustion engine) is mounted is generally called flexible fuel vehicle (hereinafter, simply referred to as FFV), and uses alcohol fuel to improve environmental performance, such as improvement in exhaust emission and reduction in the consumption of fossil fuel.

In the above-described flexible fuel internal combustion engine, various fuels having different blending ratios of alcohol and gasoline are usable, and 100 percent alcohol fuel is also usable. However, the physical property of alcohol differs from that of gasoline, so there is an appropriate way of control on the basis of the blending ratio. For example, ethanol has a lower volatility and is more hard to vaporize and has a smaller stoichiometric air-fuel ratio (A/F) than gasoline. Therefore, when ethanol is injected into an intake port, the influence of adhesion of fuel to a wall surface tends to be large.

Then, in the flexible fuel internal combustion engine, it is required to increase a correction amount corresponding to the amount of fuel adhering to the wall surface of the intake port in fuel injection control, and, particularly, the correction amount considerably increases in a cold state of the engine. Therefore, during idle operation in a cold state of the engine, the fuel injection amount may be excessive due to an increase in intake air amount through ISC. As a result, the air-fuel ratio becomes overrich, and a combustion state becomes instable, so hunting occurs in ISC, and vibrations and noise due to fluctuations in idle rotation speed may increase.

In addition, vaporization of alcohol having a low volatility mostly depends on a negative pressure in the intake port, so, when the alcohol concentration of fuel is high, although the fuel injection amount increases in response to an increase in intake air amount through ISC, fuel adhering to the wall surface is hard to vaporize due to a decrease in negative pressure (increase in pressure) in the intake port. This also presumably causes the above-described instability of combustion, and is one of factors of hunting in the control.

In contrast to this, when the alcohol concentration of fuel is high, it is conceivable to limit ISC in a cold state of the engine. However, by so doing, it is not possible to keep the idle rotation speed at a target rotation speed, and there is a concern that engine stalling occurs.

SUMMARY OF THE INVENTION

The invention reduces vibrations and noise of a flexible fuel internal combustion engine by inhibiting hunting in ISC without causing engine stalling during idle operation of the engine.

A first aspect of the invention relates to a control device for an internal combustion engine that is able to use alcohol-containing fuel. The control device includes: a throttle valve that is arranged in an intake passage of the internal combustion engine; an injector that injects fuel into the intake passage; and a controller that is configured to execute idle speed control for controlling an intake air amount with the use of the throttle valve and controlling a fuel injection amount with the use of the injector such that an idle rotation speed of the internal combustion engine becomes a target rotation speed. The controller is configured to determine whether a first condition that a temperature of the internal combustion engine is lower than or equal to a predetermined value and an alcohol concentration of the fuel is higher than or equal to a predetermined value is satisfied and whether a second condition that indicates that a probability that the internal combustion engine stalls is lower than or equal to a predetermined level is satisfied, and the controller is configured to limit the idle speed control when both the first and second conditions are satisfied; whereas the controller is configured not to limit the idle speed control when at least one of the first and second conditions is not satisfied.

With the above configuration, during idle operation in a cold state of the flexible fuel internal combustion engine, when the alcohol concentration of the usage fuel is high and the probability of stalling is low, idle speed control is limited, so a variation in intake air amount that is filled into a cylinder is gentle, and fluctuations in air-fuel ratio and instable combustion are also inhibited. Thus, hunting is hard to occur in idle speed control, so it is possible to reduce fluctuations in idle rotation speed and an increase in vibrations and noise.

On the other hand, when the probability that the internal combustion engine stalls is low, even when the alcohol concentration of fuel is high during idle operation in a cold state of the engine, idle speed control is not limited, so it is possible to avoid engine stalling while ensuring the original function of idle speed control, that is, the intake air amount, and the like, are controlled on the basis of a variation in idle rotation speed and then the idle rotation speed is converged to a target rotation speed.

Specifically, the idle speed control may be limited by prohibiting control over the intake air amount based on a variation in engine rotation speed, increasing a threshold at which control is started or providing a guard (upper limit of the absolute value of a control amount) for a control amount. It is desirable to obtain a certain level of the original function of idle speed control even when idle speed control is limited.

The controller may be configured to store a normal control characteristic in which a control amount of the idle speed control is set in association with a deviation of the idle rotation speed from the target rotation speed and a degeneracy control characteristic in which the control amount of the idle speed control is set to a value smaller (value smaller in absolute value, the same applies to the following description) than that of the normal control characteristic in association with a deviation of the idle rotation speed from the target rotation speed, and the controller may be configured to execute the idle speed control in accordance with the degeneracy control characteristic when both the first and second conditions are satisfied; whereas the controller may be configured to execute the idle speed control in accordance with the normal control characteristic when at least one of the first and second conditions is not satisfied.

By so doing, even when idle speed control is limited, it is possible to gently vary the intake air amount that is introduced into the cylinder and the air-fuel ratio by degenerating the operation of idle speed control as a whole while obtaining the original function of converging the idle rotation speed to the target rotation speed. Thus, it is possible to reduce vibrations and noise of the engine and avoid engine stalling at a high level.

The first condition may include, in addition to the condition that the alcohol concentration of the usage fuel is high during idle operation in a cold state of the engine, a condition that the number of times the control amount of the idle speed control exceeds a predetermined amount within a preset period (for example, a period from the current time point to time point a predetermined period of time before) is larger than or equal to a preset number of times. By so doing, it is possible to limit idle speed control when idle speed control is actually about to initiate hunting, so engine stalling is further reliably avoided.

The second condition, specifically, may include at least one of a condition that a load factor of the internal combustion engine is higher than or equal to a predetermined value, a condition that the idle rotation speed is higher than or equal to a predetermined rotation speed, a condition that a rate of decrease in the idle rotation speed (an amount of decrease in rotation speed per unit time) is lower than or equal to a predetermined value and a condition that an amount of decrease in the idle rotation speed from the target rotation speed is smaller than or equal to a predetermined amount.

That is, when the load factor of the internal combustion engine is higher than or equal to the predetermined value or when the idle rotation speed is higher than or equal to the predetermined rotation speed, the probability of engine stalling is low even when the intake air amount or the fuel supply amount is reduced through idle speed control. On the other hand, when the idle rotation speed is steeply decreasing or significantly lower than the target rotation speed, the probability of engine stalling is high. Then, while the load factor and the rotation speed during operation of the internal combustion engine are changed, thresholds of the load factor, rotation speed, and the like, at the time when engine stalling occurs may be determined through an experiment and simulation.

In terms of farther reliably avoiding engine stalling, idle speed control may be limited only when all the four conditions are satisfied. When reduction in vibrations and noise during idle operation is given a priority, idle speed control may be limited when any one of the four conditions is satisfied. It is applicable that a plurality of criteria (thresholds) are set for determining whether each condition is satisfied and then idle speed control is limited when it is determined that two or three conditions are satisfied using the relatively loose criteria or when it is determined that at least one condition is satisfied using the relatively strict criteria.

Furthermore, it is possible to change the way of limiting idle speed control depending on how many conditions are satisfied among the four conditions. For example, when one, two or three of four conditions are satisfied, the control amount of ISC may be reduced, and, when all the four conditions are satisfied, ISC may be prohibited. The control amount of ISC may be reduced with an increase in the number of satisfied conditions.

A second aspect of the invention relates to a control method for an internal combustion engine that is able to use alcohol-containing fuel and that includes a throttle valve arranged in an intake passage of the internal combustion engine and an injector used to inject fuel into the intake passage. The control method includes: executing idle speed control for controlling an intake air amount with the use of the throttle valve and controlling a fuel injection amount with the use of the injector such that an idle rotation speed of the internal combustion engine becomes a target rotation speed; determining whether a first condition that a temperature of the internal combustion engine is lower than or equal to a predetermined value and an alcohol concentration of the fuel is higher than or equal to a predetermined value is satisfied and whether a second condition that indicates that a probability that the internal combustion engine stalls is lower than or equal to a predetermined level is satisfied; and limiting the idle speed control when both the first and second conditions are satisfied; whereas not limiting the idle speed control when at least one of the first and second conditions is not satisfied.

As described above, with the control device and control method according to the aspects of the invention, during idle operation in a cold state of the flexible fuel internal combustion engine that is able to use alcohol-containing fuel, even when the alcohol concentration of the usage fuel is high, it is possible to inhibit an increase in vibrations and noise by suppressing combustion fluctuations without a concern about engine stalling.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described with reference to the accompanying drawings. In this embodiment, description will be made on the case where the invention is applied to an intake port injection engine (internal combustion engine) mounted on an FFV.

Engine

Figure 1:
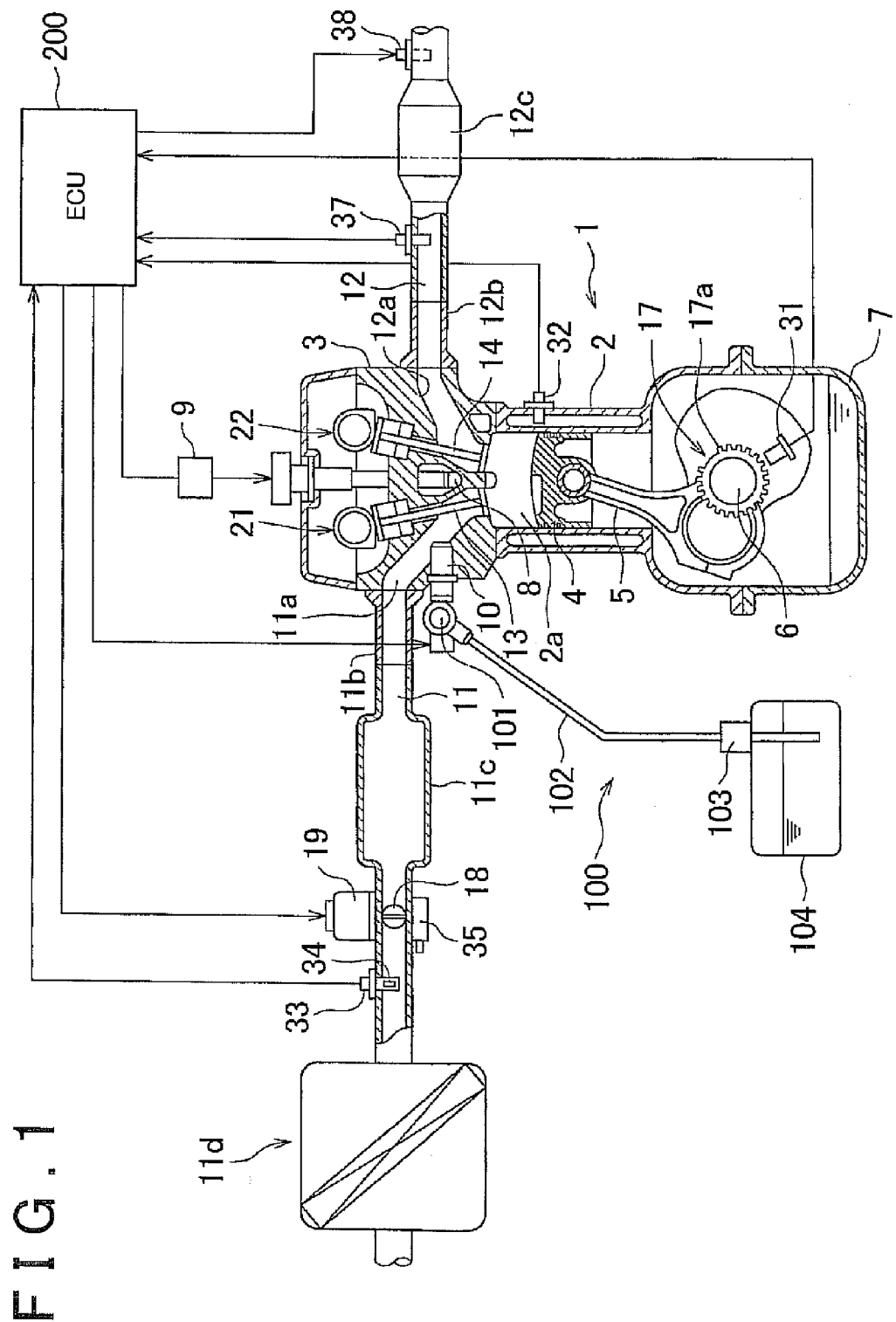
FIG. 1 is a view that shows the schematic configuration of an engine to which a control device according to an embodiment of the invention is applied.

FIG. 1 shows the schematic configuration of an engine 1 according to the embodiment. For example, the engine 1 is an in-line four-cylinder engine, and includes a cylinder block 2 in which four cylinders 2a are arranged in line although only one of them is shown in the drawing. A cylinder head 3 is connected to the upper portion of the cylinder block 2. A piston 4 is inserted in each of the cylinders 2a so as to be reciprocally movable, and a corresponding one of combustion chambers is defined between each piston 4 and the lower face of the cylinder head 3.

On the other hand, the lower portion of the cylinder block 2 is formed as a crank case, and accommodates a crankshaft 6 coupled to the pistons 4 by corresponding connecting rods 5. The reciprocal motion of each piston 4 is converted to the rotation of the crankshaft 6 via the corresponding connecting rod 5. A signal rotor 17 is connected to the crankshaft 6. A crank position sensor 31 formed of, for example, an electromagnetic pickup outputs a pulsed signal in correspondence with passage of a plurality of teeth (protrusions) 17a formed at the outer periphery of the signal rotor 17.

An oil pan 7 is connected to the lower portion of the cylinder block 2 so as to cover the crankshaft 6 from the lower side. Although not shown in the drawing, oil stored in the oil pan 7 is drawn by an oil pump during operation of the engine 1, and is supplied to various lubricated portions of the engine 1. A coolant temperature sensor 32 is arranged on the side wall of the cylinder block 2. The coolant temperature sensor 32 detects the temperature of engine coolant (coolant temperature).

Ignition plugs 8 are arranged at the cylinder head 3 so as to protrude into the corresponding cylinders 2a. Each ignition plug 8 is supplied with a high voltage from an igniter 9 that is controlled by an electronic control unit (ECU) 200 (described later) to discharge spark, and ignites air-fuel mixture in the corresponding cylinder 2a. The ignition timing is set in the second half of a compression stroke for each cylinder 2a, and is controlled on the basis of the operating state of the engine 1.

Part of an intake passage 11 that supplies air-fuel mixture into the cylinders 2a is formed of intake ports 11a formed in the cylinder head 3 and an intake manifold 11b connected to the intake ports 11a. An intake valve 13 is arranged at each of the openings of the intake passage 11, facing the insides of the cylinders 2a. Similarly, part of an exhaust passage 12 that emits burned gas (exhaust gas) is formed of exhaust ports 12a formed in the cylinder head 3 and an exhaust manifold 12b connected to the exhaust ports 12a. An exhaust valve 14 is arranged at each of the openings of the exhaust passage 12, facing the insides of the cylinders 2a.

A valve actuating system is provided at the cylinder head 3. The valve actuating system is used to open or close the intake valves 13 and the exhaust valves 14. For example, the valve actuating system of the engine 1 is of a DOHC type that includes an intake camshaft 21 and an exhaust camshaft 22 that respectively drive the intake valves 13 and the exhaust valves 14. As these camshafts 21 and 22 are rotated in synchronization with the crankshaft 6 via a timing chain, or the like, the intake valves 13 and the exhaust valves 14 are opened or closed at appropriate timing for each cylinder 2a.

A surge tank 11c and an air cleaner 11d are provided on the intake upstream side of the intake manifold 11b in the intake passage 11. An air flow meter 33, an intake air temperature sensor 34 (incorporated in the air flow meter 33), a throttle valve, and the like, are arranged between the surge tank 11c and the air cleaner 11d. The throttle valve 18 is used to adjust the flow rate of intake air. A valve element of the throttle valve 18 is driven by a throttle motor 19 that is controlled by the ECU 200. The position, that is, the throttle opening degree, of the valve element is detected by a throttle opening degree sensor 35.

An injector (fuel injection valve) 10 is arranged in each intake port 11a. Each injector 10 is able to inject alcohol or gasoline solely or mixed fuel. Each injector 10 is supplied with fuel from a fuel supply system 100 via a delivery pipe 101, and injects fuel into the corresponding intake port 11a. The thus injected fuel is mixed with air in the corresponding intake port 11a and in the corresponding cylinder 2a to form air-fuel mixture. The air-fuel mixture is ignited by the ignition plug 8 and burned and exploded as described above.

Burned gas (exhaust gas) flows out to the exhaust passage 12, and is purified by a three-way catalyst 12c downstream of the exhaust manifold 12b. An air-fuel ratio (A/F) sensor 37 is arranged in the exhaust passage 12 at a portion upstream of the three-way catalyst 12c, and an $O_2$ sensor 38 is arranged in the exhaust passage 12 at a portion downstream of the three-way catalyst 12c. For example, the air-fuel ratio (A/F) sensor 37 is a sensor that exhibits a linear characteristic against an air-fuel ratio, and the $O_2$ sensor 38 generates an electromotive force corresponding to an oxygen concentration in exhaust gas.

The fuel supply system 100 includes the delivery pipe 101, a fuel supply tube 102, a fuel pump (for example, electric pump) 103, a fuel tank 104, and the like. The delivery pipe 101 is connected to each of the injectors 10 of the four cylinders 2a. The fuel supply tube 102 is connected to the delivery pipe 101. The fuel supply system 100 supplies fuel in the fuel tank 104 to the delivery pipe 101 via the fuel supply tube 102 through operation of the fuel pump 103 that is controlled by the ECU 200.

The engine 1 according to the present embodiment is configured to be able to use alcohol or gasoline as fuel solely or a mixture of alcohol and gasoline as fuel, so fuel having a predetermined alcohol concentration is stored in the fuel tank 104. The fuel may be in the case of 100 percent gasoline, in the case of a blended fuel in which alcohol, such as methanol and ethanol, is contained in gasoline or in the case of 100 percent alcohol. The physical property of alcohol differs from that of gasoline, so it is desirable to change the way of control on the basis of the concentration of alcohol.

In this embodiment, although detailed description is omitted, the ECU 200 executes a predetermined program to learn the alcohol concentration of fuel. Various methods are known for the learning. For example, a method that focuses on the fact that a deviation in air-fuel ratio when the engine 1 is in a cold state occurs due to oil dilution caused by alcohol-containing fuel may be used. That is, it is just required to calculate an alcohol concentration learned value as a larger value as an actual air-fuel ratio when the engine 1 is in a cold state deviates from a stoichiometric air-fuel ratio due to an increase in the degree of oil dilution caused by fuel and, as a result, an increase in the amount of evaporation of fuel (mostly the amount of evaporation of gasoline) from engine oil.

ECU

Figure 2:
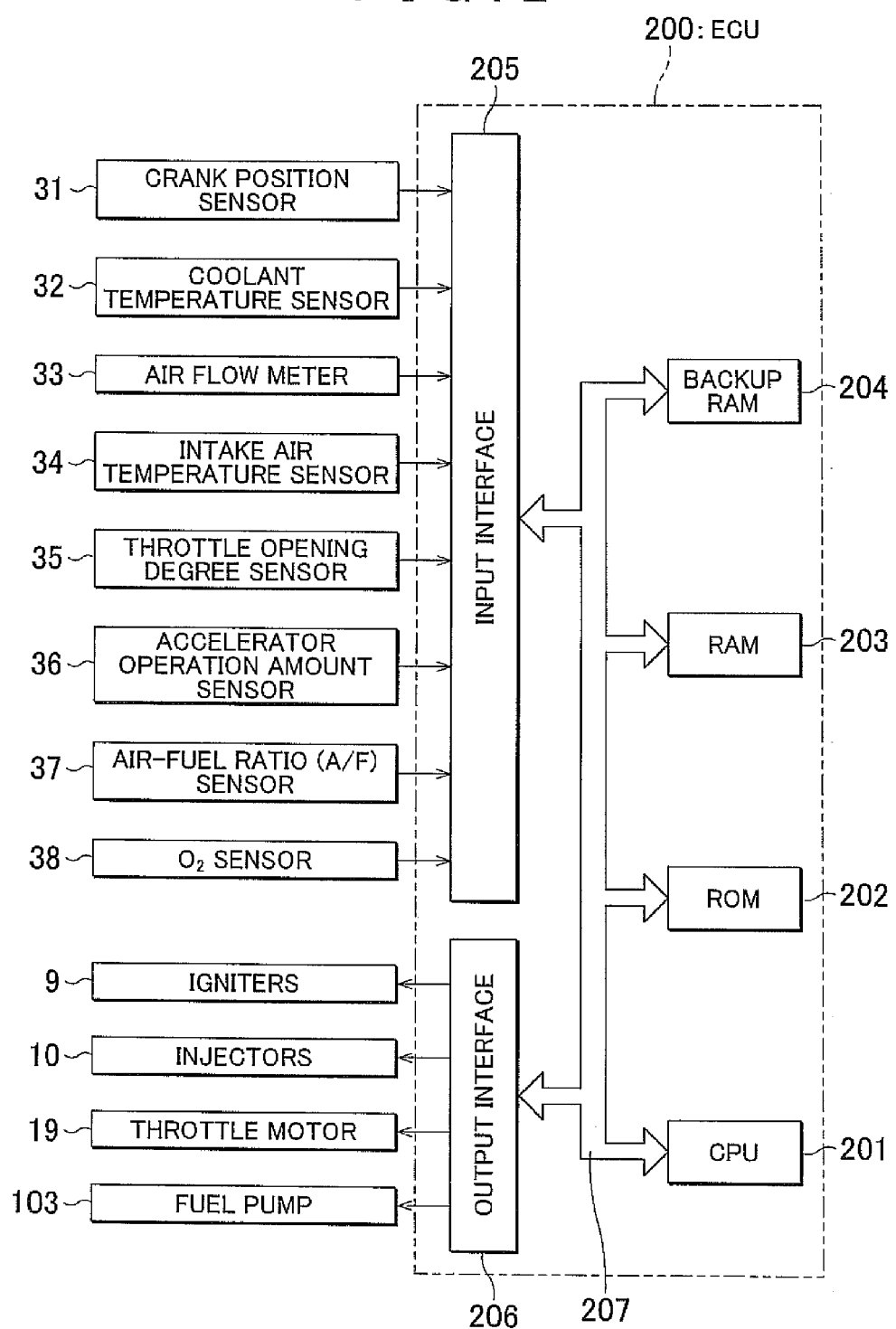
FIG. 2 is a block diagram that shows a control system of the engine.

The operating state of the thus configured engine 1 is controlled by the ECU 200 that serves as a controller. As shown in FIG. 2, the ECU 200, for example, includes a CPU 201, a ROM 202, a RAM 203, a backup RAM 204, and the like.

The ROM 202 stores various control programs and maps, and the like, that are consulted when those various control programs are executed. The CPU 201 executes various arithmetic processings on the basis of the various control programs and maps that are stored in the ROM 202. The RAM 203 is a memory that temporarily stores computation results in the CPU 201, data input from the sensors, and the like. The backup RAM 204 is a nonvolatile memory that stores data, and the like, to be saved at the time of, for example, a stop of the engine 1.

The above-described CPU 201, ROM 202, RAM 203 and backup RAM 204 are connected to one another via a bus 207, and are connected to an input interface 205 and an output interface 206. Various sensors are connected to the input interface 205. The various sensors include the crank position sensor 31, the coolant temperature sensor 32, the air flow meter 33, the intake air temperature sensor 34, the throttle opening degree sensor 35, an accelerator operation amount sensor 36, the air-fuel ratio (A/F) sensor 37, the 07 sensor 38, and the like. The accelerator operation amount sensor 36 outputs a detection signal corresponding to a depression amount of an accelerator pedal.

On the other hand, the igniters 9 of the ignition plugs 8, the injectors 10, the throttle motor 19 of the throttle valve 18, the fuel pump 103 of the fuel supply system 100, and the like, are connected to the output interface 206. The ECU 200 executes various control programs over the engine 1 on the basis of signals from the above-described various sensors. The various control programs include control over the ignition timing of each ignition plug 8, drive control over the injectors 10 (fuel injection control), control over the opening degree of the throttle valve 18, and the like.

ISC Control

Hereinafter, idle speed control (ISC) that is executed by the ECU 200 in the present embodiment will be described in detail. ISC is a feedback control in which, as is known, an actual engine rotation speed (idle rotation speed) is detected during idle operation of the engine 1, and the intake air amount is varied on the basis of a deviation of the detected actual engine rotation speed from a target engine rotation speed (also simply referred to as target rotation speed) during idle operation.

Specifically, the ECU 200 calculates an idle rotation speed ene on the basis of the signal from the crank position sensor 31, and, when the idle rotation speed ene is lower than a target rotation speed entcal, actuates the throttle valve 18 in a direction to open the throttle valve 18. By so doing, the intake air amount is corrected to increase. On the other hand, when the calculated idle rotation speed ene is higher than the target rotation speed entcal, the ECU 200 actuates the throttle valve 18 in a direction to close the throttle valve 18. By so doing, the intake air amount is corrected to reduce.

An ISC intake air correction amount eqdln (ISC control amount) for changing the opening degree of the throttle valve 18 in this way is determined by consulting a preset ISC intake air correction map (normal control characteristic) on the basis of a rotation speed deviation Δene between the idle rotation speed ene and the target rotation speed entcal. For example, an appropriate change correction amount for changing the intake air amount that passes through the throttle valve 18 is set in the ISC intake air correction map in association with the idle rotation speed ene and its rotation speed deviation Δene. The ECU 200 determines the correction amount of the opening degree of the throttle valve 18 on the basis of the change correction amount.

The ECU 200 predicts an intake air amount that is filled into each cylinder 2a on the basis of the current opening degree of the throttle valve 18 and a variation in the opening degree, and determines the amount of fuel that is injected from each injector 10 on the basis of the predicted intake air amount eklfwd such that the air-fuel ratio becomes a target air-fuel ratio. For example, when the throttle valve 18 is actuated in a direction to open, the amount of intake air that is filled into each cylinder 2a increases with a: delay, so the intake air amount eklfwd that is filled into each cylinder 2a is predicted in consideration of the amount of increase, and a fuel injection amount corresponding to the intake air amount eklfwd is calculated.

Figure 3:
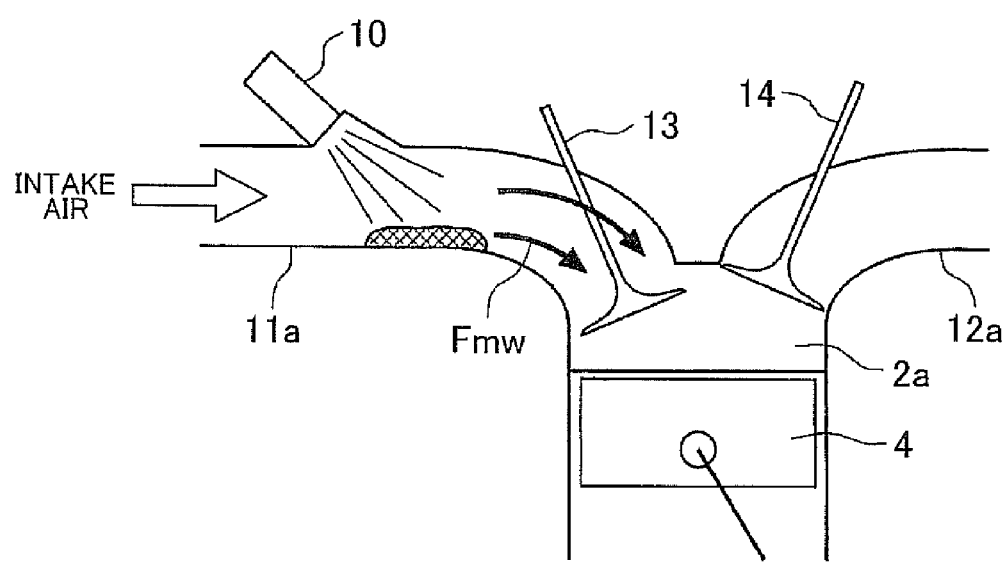
FIG. 3 is a schematic view that illustrates adhesion of fuel to a wall surface of an intake port.

However, part of fuel injected from each injector 10 adheres to the wall surface of the corresponding intake port 11a as schematically indicated by cross hatching in FIG. 3, and is introduced into the corresponding cylinder 2a (indicated by the arrow Fmw in FIG. 3) in the next or following cycle, so the fuel injection amount needs to be corrected by the amount of fuel adhering to the wall surface. Therefore, a control signal (injection pulse), that is, a target fuel injection amount etauout, transmitted to each injector 10, includes a wall surface adhesion correction amount efmw, and, when the intake air amount increases as described above, the wall surface adhesion correction amount efmw also increases.

Here, the engine 1 that uses alcohol-containing fuel as in the case of the present embodiment is operated at an air-fuel ratio (A/F) that is smaller than that of a general gasoline engine, so the amount of fuel adhering to the wall surface of each intake port 11a increases, and the volatility of alcohol-containing fuel is low and fuel that has once adhered to the wall surface is hard to vaporize. Therefore, it is required to increase the wall surface adhesion correction amount efmw. Particularly, when the alcohol concentration of usage fuel is high, fuel is significantly hard to vaporize in a cold state of the engine 1 (for example, when the engine coolant temperature is lower than or equal to 45° C.), and the wall surface adhesion correction amount efmw considerably increases.

Therefore, during idle operation in a cold state of the engine 1, hunting occurs in ISC due to an error included in the predicted intake air amount eklfwd, individual variations among the injectors 10, and the like, variations in idle rotation speed increase and, as a result, vibrations and noise may increase. Vaporization of alcohol-containing fuel mostly depends on a negative pressure in each intake port. Therefore, the fact that fuel adhering to the wall surface is further harder to vaporize due to a decrease in negative pressure (increase in pressure) in each intake port 11a although the fuel injection amount increases when the intake air amount increases through ISC is presumably one of factors that cause the above-described inconvenience.

Figure 4:
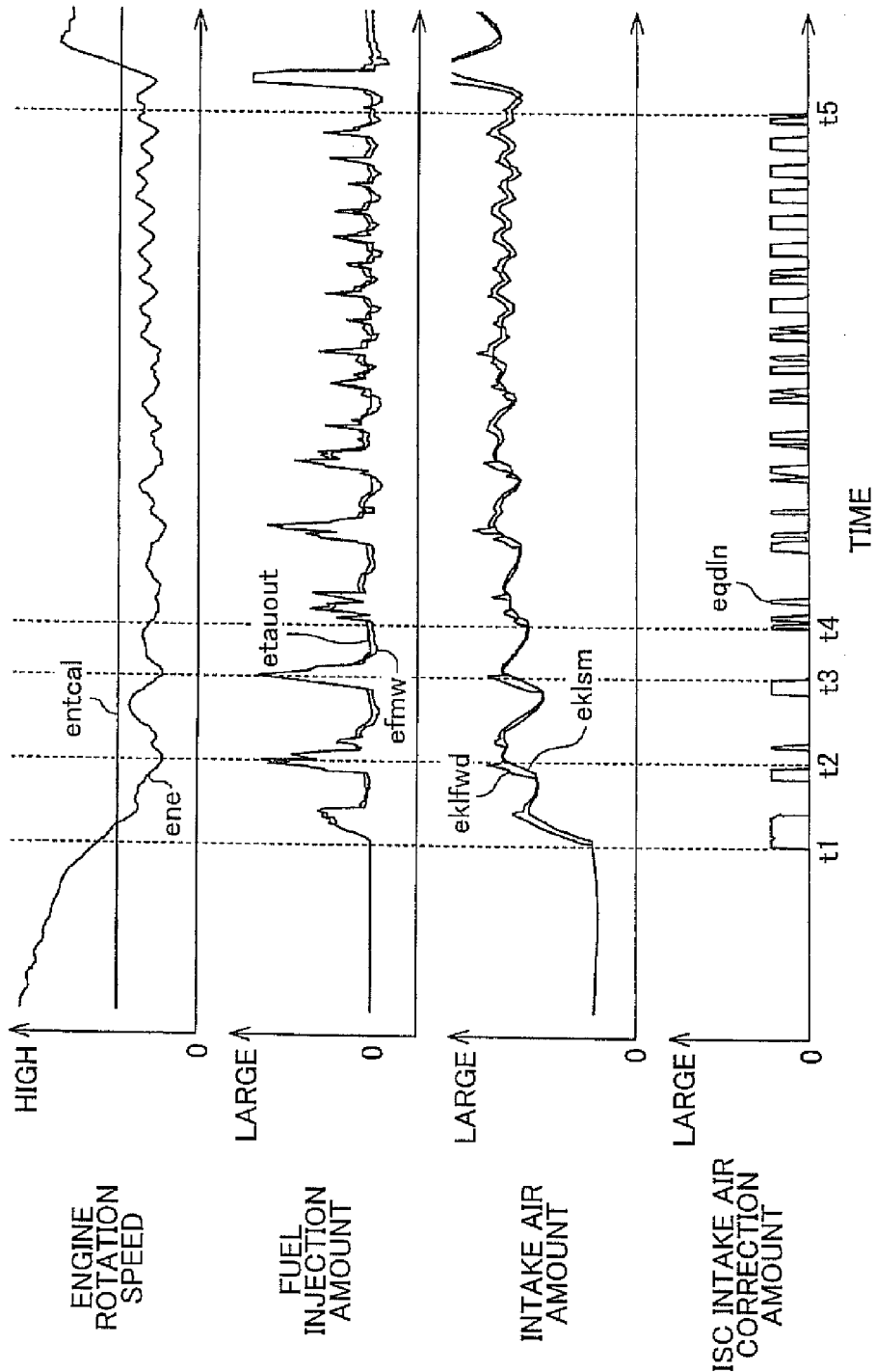
FIG. 4 is a time chart that shows an example of hunting in ISC.

More specifically, FIG. 4 shows a state where hunting occurs in ISC in a cold state of the engine 1 in the case where 100 percent alcohol fuel (E100) is used. An example of the time chart shows a state where the engine coolant temperature is about 25° C. after a lapse of several tens of seconds from when the FFV starts travelling after a cold start of the engine 1. Then, a clutch is disengaged during deceleration of the FFV, the idle rotation speed (engine rotation speed) ene decreases as expressed by the top graph, and it is determined that the idle rotation speed ene is lower than the target rotation speed entcal at time t1 in the graph on the basis of the degree of the decrease, and the like.

Thus, when ISC is started and the ISC intake air correction amount eqdln rises as expressed by the bottom-row graph, the throttle valve 18 is actuated in a direction to open accordingly. Thus, the flow rate of intake air increases, the amount of intake air that is filled into each cylinder 2a (predicted intake air amount eklfwd and actual intake air amount eklsm) increases as expressed by the bottom graph, and the target fuel injection amount etauout that is calculated on the basis of the predicted intake air amount eklfwd also increases (shown in the top graph).

Here, an actual air amount eklsm shown in the bottom graph is calculated on the basis of a negative pressure in the intake manifold 11b, and, when the intake air amount increases as expressed by the graph, the predicted intake air amount eklfwd is larger than the actual air amount eklsm. For example, a deviation amount of the predicted intake air amount eklfwd from the actual air amount eklsm at each of time t2 and time t3 is instantaneously about twenty percent of the actual air amount eklsm, and the target fuel injection amount etauout becomes excessive due to this influence.

Such an increase in the target fuel injection amount etauout is mostly due to the wall surface adhesion correction amount efmw of fuel, which is calculated on the basis of an increase in the predicted intake air amount eklfwd. However, as described above, in the engine 1 that uses alcohol-containing fuel, the wall surface adhesion correction amount efmw in a cold state of the engine 1 is set to be considerably large, so, together with a deviation of the predicted intake air amount eklfwd as described above, the wall surface adhesion correction amount efmw is excessive, and the target fuel injection amount etauout is excessive.

Generally, in ISC, in consideration of drivability and engine-stall resistance, the amount of increase in fuel in correspondence with an increase in the predicted intake air amount eklfwd is set to a slightly large value such that the air-fuel ratio is slightly rich; whereas, the amount of reduction in fuel in correspondence with a reduction in the predicted intake air amount eklfwd is set to a slightly small value. Therefore, the target fuel injection amount etauout tends to be excessive through repetition of ISC at time t1, time t2 and time t3.

When the target fuel injection amount etauout becomes excessive and the air-fuel ratio of air-fuel mixture becomes overrich in this way, a combustion state is instable. Therefore, as is shown at time t4 to time t5, the ISC intake air correction amount eqdln initiates hunting, and repeatedly increases or reduces at extremely short time intervals. In response to this, the throttle valve 18 repeats steep opening and closing operations, and the predicted intake air amount eklfwd and the fuel injection amount (wall surface adhesion correction amount efmw) also initiate hunting.

In this way, in the FFV, during idle operation in a cold state of the engine 1 that uses fuel having a high alcohol concentration, the air-fuel ratio becomes overrich due to an increase in intake air amount through ISC, and a combustion state becomes instable. As a result, hunting occurs in ISC, and fluctuations in idle rotation speed increase, which may cause vibrations and noise to increase.

In contrast to this, in the present embodiment, when the alcohol concentration of usage fuel is higher than or equal to a predetermined concentration during idle operation in a cold state of the engine 1 and, therefore, hunting presumably occurs in ISC, an increase in vibrations and noise of the engine 1 is inhibited by limiting ISC on the condition that there is no concern about engine stalling.

Figure 5:
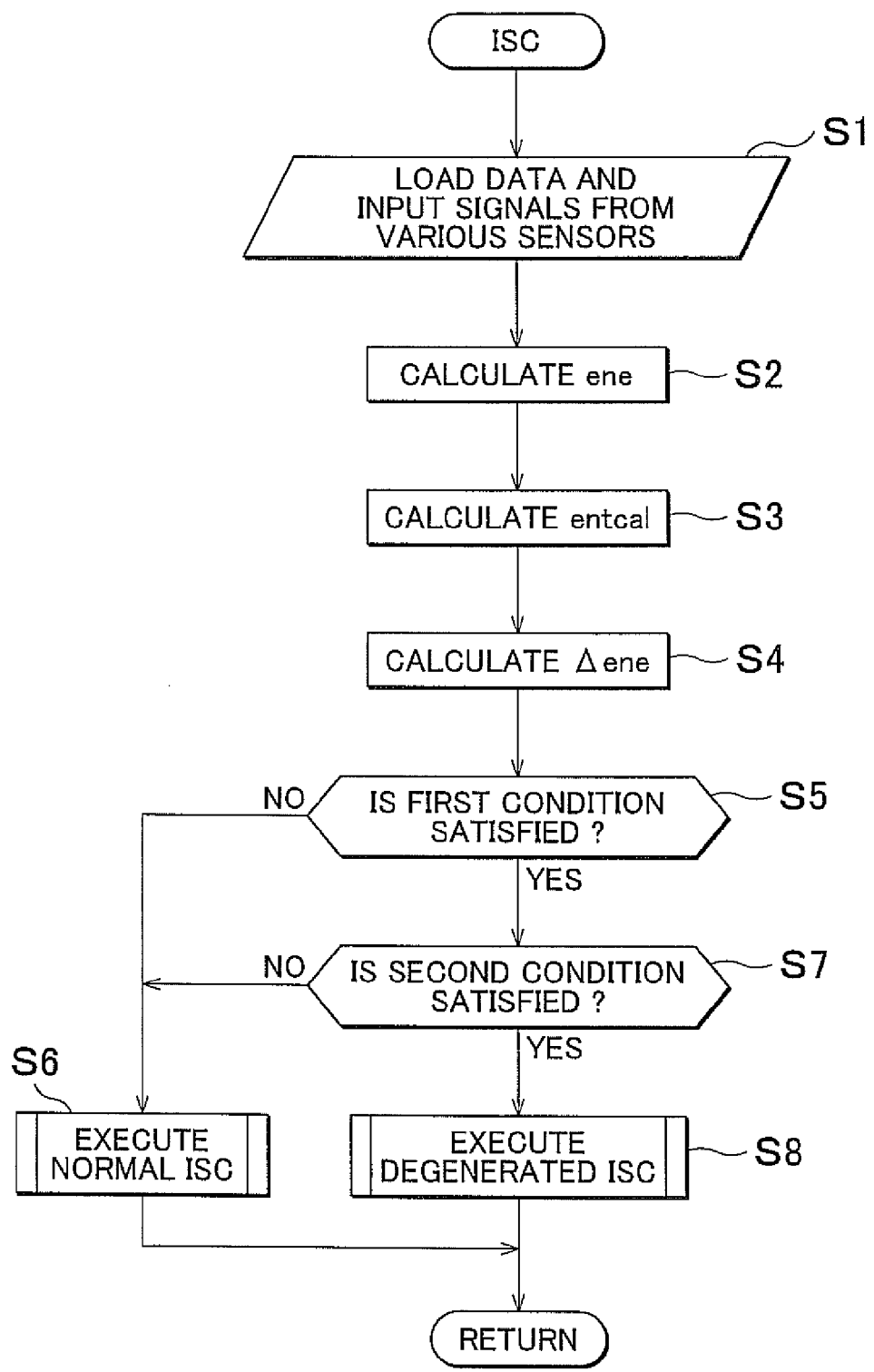
FIG. 5 is a flowchart that shows the flow of ISC that is executed by an ECU.

Hereinafter, the flow of processes of ISC that is executed by the ECU 200 in a cold state of the engine 1 will be described with reference to the flowchart shown in FIG. 5. The ISC routine is repeatedly executed at set time intervals, for example, when it is determined that a predetermined condition, such as a condition that an accelerator is fully closed during operation of the engine 1, is satisfied and it is in an idle state.

In the ISC routine according to the embodiment, in step S1, data, such as an alcohol concentration learned value, are loaded from the RAM 203 of the ECU 200, and signals are input from various sensors, such as the crank position sensor 31 and the coolant temperature sensor 32. A current idle rotation speed ene is calculated on the basis of the signal from the crank position sensor 31 (step S2), and a target rotation speed entcal is determined by consulting the preset map on the basis of the operating states of auxiliaries, such as an air conditioner and an alternator, the engine coolant temperature ethw, and the like (step S3).

Subsequently, a deviation Δene between the current idle rotation speed ene and the target rotation speed entcal is calculated (step S4), and it is determined whether a first condition that indicates that it is desirable to limit ISC is satisfied (step S5). The first condition is that the engine 1 is in a cold state where the coolant temperature ethw of the engine 1 is lower than or equal to a predetermined temperature (for example, 40° C.), the alcohol concentration of fuel is higher than or equal to a predetermined value, and the number of times that the amount of increase in the intake air amount through ISC, that is, the ISC intake air correction amount eqdln, exceeds a predetermined amount is larger than or equal to a preset number of times during a period from the current time point to time point a predetermined period of time before the current time point.

That is, in the embodiment, it is determined that the first condition is satisfied not only when hunting in ISC is predicted in the case where the alcohol concentration of fuel is high in a cold state of the engine 1 but also when ISC is actually repeatedly executed and the probability of occurrence of hunting is higher than or equal to a predetermined level. The number of times the ISC intake air correction amount eqdln exceeds the predetermined amount is updated with time, so the number of times becomes zero after a lapse of a predetermined period of time from when the number of times has exceeded the predetermined amount last time. In addition, the number of times is cleared to zero when the engine 1 is not in an idle operating state any longer.

When it is determined in step S5 that the first condition is not satisfied (NO), the process proceeds to step S6, and then normal ISC is executed. That is, the ISC intake air correction amount eqdln is loaded from the ISC intake air correction map stored in the ROM 202 of the ECU 200 on the basis of the rotation speed deviation Δene calculated in step S4. A target intake air flow rate including the ISC intake air correction amount eqdln is determined, and the opening degree of the throttle valve 18 is controlled on the basis of the target intake air flow rate.

The ECU 200 calculates a predicted intake air amount eklfwd into each cylinder 2a on the basis of the opening degree of the throttle valve 18 and a variation in the opening degree, and determines a target fuel injection amount etauout for each injector 10 on the basis of the predicted intake air amount eklfwd. By appropriately increasing or reducing the intake air amount and fuel injection amount to each cylinder 2a on the basis of the engine rotation speed deviation Δene in this way, it is possible to quickly converge the idle rotation speed ene to the target rotation speed entcal while suppressing an overshoot.

On the other hand, when it is determined in step S5 that the first condition is satisfied (YES), it is subsequently determined whether a second condition that indicates that the probability of occurrence of engine stalling is lower than or equal to a predetermined level is satisfied (step S7). In the present embodiment, for example, the second condition is satisfied when the current load factor of the engine 1 is higher than or equal to a predetermined value, the idle rotation speed ene is higher than or equal to a predetermined rotation speed, the rate of decrease in the idle rotation speed ene (the amount of decrease per unit time) is lower than or equal to a predetermined value, the amount of decrease in the idle rotation speed ene from the target rotation speed entcal is smaller than or equal to a predetermined amount and, therefore, the probability of occurrence of engine stalling is significantly low.

That is, when the load factor of the engine 1 (which may be calculated on the basis of the intake air amount that is filled into each cylinder 2a) is higher than or equal to the predetermined value or the idle rotation speed ene is higher than or equal to the predetermined rotation speed, it may be understood that the probability of occurrence of engine stalling is low even when ISC is limited. On the other hand, when the idle rotation speed is steeply decreasing or significantly lower than the target rotation speed entcal, it may be understood that the probability of occurrence of engine stalling is high. Thus, thresholds (determination criteria) of the above-described four conditions are set by determining a load factor, a rotation speed, and the like, at the time when engine stalling actually occurs through an experiment or simulation.

When all the four conditions are satisfied, the probability of occurrence of engine stalling is significantly low, and it is determined that there is substantially no concern about occurrence of engine stalling. At this time, it is determined that the second condition is satisfied (YES in step S7), the process proceeds to step S8, and ISC is limited. On the other hand, when at least one of the four conditions is not satisfied, it is determined that the second condition is not satisfied (NO in step S7), the process proceeds to step S6, and normal ISC is executed.

Limiting ISC in step S8 is to execute degenerated ISC by consulting a degeneracy correction map (degeneracy control characteristic) for ISC in the embodiment. In the degeneracy correction map, the ISC intake air correction amount eqdln corresponding to the idle rotation speed ene and its deviation Δene is set as a value that is smaller in absolute value than that in the normal ISC intake air correction map. In the degeneracy correction map, for the ISC intake air correction amount eqdln, the absolute value of a positive value for increasing the flow rate of intake air may be reduced, whereas the absolute value of a negative value for reducing the flow rate of intake air may be set so as to be equal to that in the normal map or may be set so as to be larger than that in the normal map.

The ISC intake air correction amount eqdln is determined by consulting the degeneracy correction map, and the target intake air flow rate including the ISC intake air correction amount eqdln is determined. The opening degree of the throttle valve 18 is controlled on the basis of the target intake air flow rate. In addition, the predicted intake air amount eklfwd to each cylinder 2a is calculated, and the target fuel injection amount etauout (including the wall surface adhesion correction amount efmw) of each injector 10 is determined on the basis of the predicted intake air amount eklfwd. By so doing, variations in intake air amount and fuel injection amount through ISC are gentle, so the above-described hunting is hard to occur.

Figure 6:
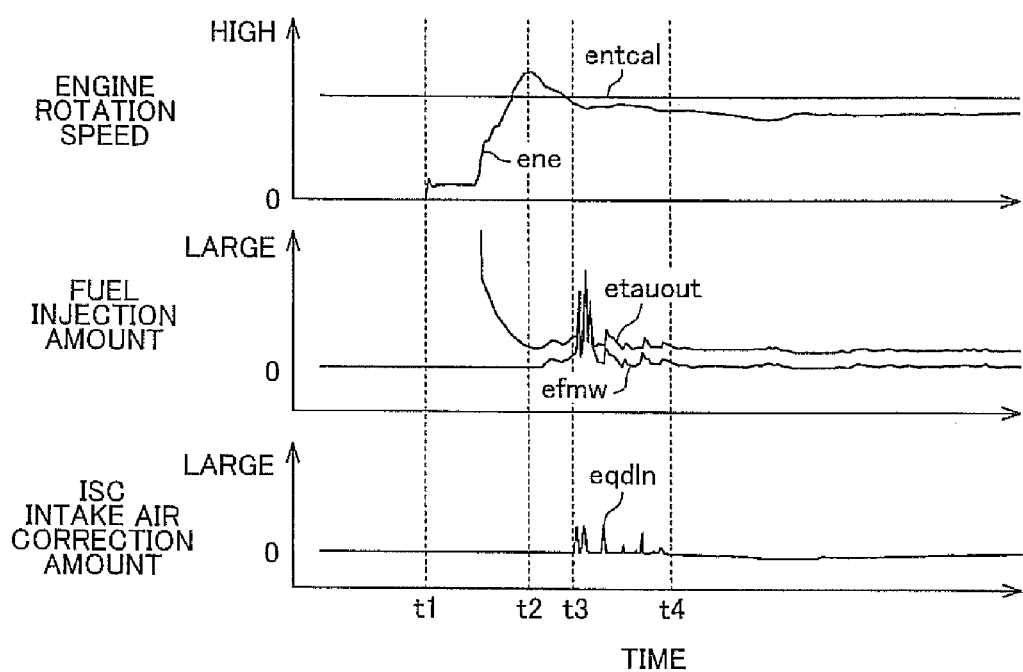
FIG. 6 is a time chart that shows hunting after a cold start in the case where ISC is not limited.

FIG. 6 shows a state where hunting occurs in ISC immediately after a cold start in the case where 100 percent alcohol fuel (E100) is used in the engine 1 according to the embodiment and ISC is not limited. That is, after cranking is started at time t1 and engine rotation rises at time t2 (completion of start), when it is determined that the engine rotation speed ene decreases to below the target rotation speed entcal (for example, about 1500 rpm) of fast idle, ISC is started (time t3).

Figure 7:
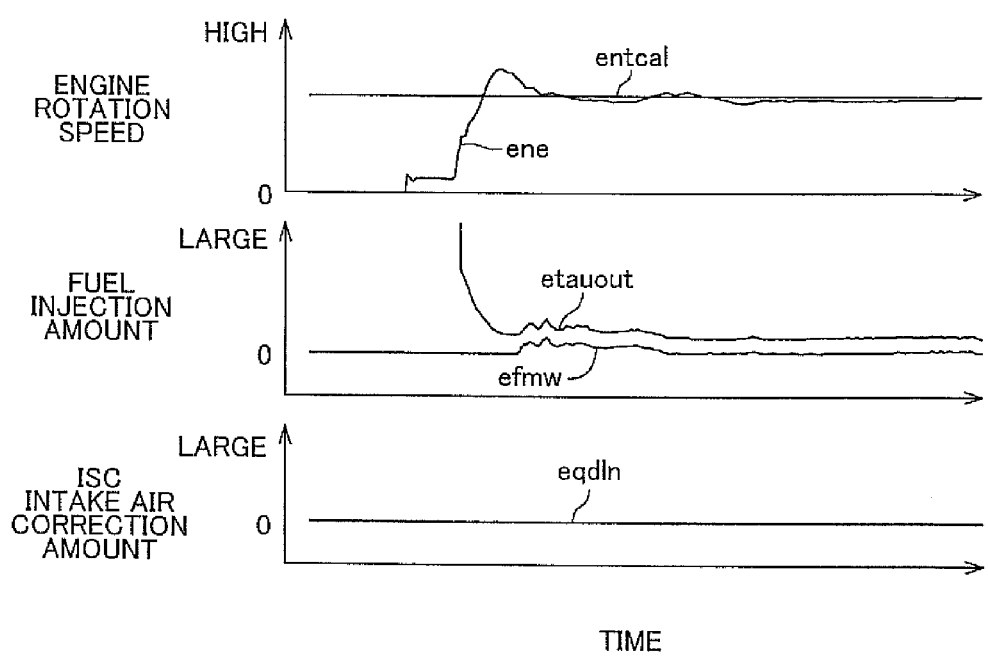
FIG. 7 is a view corresponding to FIG. 6 in the case where ISC is limited.

As in the case during deceleration of the FFV as described with reference to FIG. 4, the ISC intake air correction amount eqdln initiates hunting, and the wall surface adhesion correction amount efmw of fuel and the total injection amount etauout also initiate hunting due to the hunting of the ISC intake air correction amount eqdln (up to t4). In contrast to this, when ISC is limited as described above, it appears that hunting of the fuel injection amount (etauout, efmw) does not occur if the ISC intake air correction amount eqdln is kept at 0 as shown in FIG. 7.

Thus, according to the above-described embodiment, during idle operation in a cold state of the engine 1 (flexible fuel internal combustion engine) that uses alcohol-containing fuel, when the alcohol concentration of the usage fuel is higher than or equal to a predetermined value and ISC is actually repeated a predetermined number of times (the first condition is satisfied), and, on the condition that there is substantially no concern about occurrence of engine stalling (the second condition is satisfied), it is possible to prevent hunting in control by limiting ISC. Thus, it is possible to suppress fluctuations in idle rotation speed and, as a result, reduce an increase in vibrations and noise.

In addition, by controlling the throttle valve 18 and the injectors 10 using the degeneracy correction map as described above to limit ISC, it is possible to obtain the original function of ISC, that is, adjusting an engine power such that the idle rotation speed ene converges to the target rotation speed entcal.

On the other hand, when there is a concern about engine stalling, even when there is a possibility that ISC initiates hunting as described above, ISC is not limited. By so doing, occurrence of engine stalling is avoided. In the embodiment, it is determined whether there is a concern about engine stalling on the basis of the load factor and rotation speed of the engine 1, the degree of decrease in the rotation of the engine 1, and the like, and, only when all the four conditions are satisfied, ISC is limited, so it is possible to further reliably avoid engine stalling.

Alternative Embodiments

The invention is not limited to the above-described embodiment. The invention encompasses various other alternative embodiments. For example, in the above-described embodiment, the first condition that indicates that ISC is desirably limited is that the alcohol concentration is higher than or equal to a predetermined value in a cold state of the engine 1 and ISC is actually repeated a predetermined number of times; however, it is not limited to this configuration. The first condition may be only that the alcohol concentration in a cold state of the engine 1 is higher than or equal to a predetermined value.

In addition, four conditions are listed as the second condition that indicates the probability of engine stalling, and, only when all the conditions are satisfied, ISC is limited. However, it is not limited to this configuration. For example, when reduction in vibrations and noise of the engine 1 during idle operation is given a priority, ISC may be limited when one, two or three of the four conditions are satisfied.

It is applicable that, for each of the four conditions, a relatively loose determination criterion (threshold) and a relatively strict determination criterion are provided and, when it is determined that two, three or four conditions are satisfied using the loose criteria or when it is determined that any one of the conditions is satisfied using the strict criteria, ISC is limited.

In the above-described embodiment, ISC is limited by using the degeneracy correction map; however, it is not limited to this configuration. As the way of limiting ISC, control may be prohibited, a threshold at which control is started may be increased or a guard (upper limit of the absolute value of a control amount) may be provided for the control amount.

It is possible to change the way of limiting ISC depending on how many conditions are satisfied among the four conditions. For example, when one, two or three of four conditions are satisfied, the control amount of ISC may be reduced, and, when all the four conditions are satisfied, ISC may be prohibited. The control amount of ISC may be reduced with an increase in the number of satisfied conditions.

Furthermore, the alcohol concentration of fuel may not be learned as in the case of the above-described embodiment; instead, an alcohol concentration sensor may be provided in the fuel supply tube 102 of the fuel supply system 100 to detect the alcohol concentration of fuel. The alcohol concentration sensor may be of a capacitance type that detects the alcohol concentration on the basis of the dielectric constant of fuel or may be of an optical type that detects the alcohol concentration on the basis of the refractive index of fuel.

In the above-described embodiment, the description is made in the case where the invention is applied to the in-line four-cylinder engine 1 that includes the four cylinders 2a. The control device according to the invention may be applied to a single-cylinder or multi-cylinder (other than four-cylinder) flexible fuel internal combustion engine.

According to the invention, even when the alcohol concentration of usage fuel is high during idle operation in a cold state of the engine, it is possible to inhibit an increase in vibrations and noise of the engine by suppressing hunting in ISC without a concern about engine stalling. Thus, it is remarkably advantageous when the invention is applied to a flexible fuel internal combustion engine mounted on an FFV.

What is claimed is:

1. A control device for an internal combustion engine that is able to use alcohol-containing fuel, comprising:
   a throttle valve that is arranged in an intake passage of the internal combustion engine;
   an injector that injects fuel into an intake port that constitutes a part of the intake passage; and
   a controller,
   the controller being configured to execute idle speed control for controlling an intake air amount with the use of the throttle valve and controlling a fuel injection amount with the use of the injector such that an idle rotation speed of the internal combustion engine becomes a target rotation speed,
   the controller being configured to determine whether a first condition that a temperature of the internal combustion engine is lower than or equal to a predetermined value and an alcohol concentration of the fuel is higher than or equal to a predetermined value is satisfied and whether a second condition that indicates that a probability that the internal combustion engine stalls is lower than or equal to a predetermined level is satisfied,
   the controller being configured to limit the idle speed control when both the first and second conditions are satisfied; whereas the controller is configured not to limit the idle speed control when at least one of the first and second conditions is not satisfied.

2. The control device according to claim 1, wherein
the controller is configured to store a normal control characteristic in which a control amount of the idle speed control is set in association with a deviation of the idle rotation speed from the target rotation speed and a degeneracy control characteristic in which the control amount of the idle speed control is set to a value smaller than that of the normal control characteristic in association with a deviation of the idle rotation speed from the target rotation speed, and
the controller is configured to execute the idle speed control in accordance with the degeneracy control characteristic when both the first and second conditions are satisfied; whereas the controller is configured to execute the idle speed control in accordance with the normal control characteristic when at least one of the first and second conditions is not satisfied.

3. The control device according to claim 1, wherein
the first condition includes a condition that the number of times the control amount of the idle speed control exceeds a predetermined amount within a preset period is larger than or equal to a preset number of times.

4. The control device according to claim 1, wherein
the second condition includes at least one of a condition that a load factor of the internal combustion engine is higher than or equal to a predetermined value, a condition that the idle rotation speed is higher than or equal to a predetermined rotation speed, a condition that a rate of decrease in the idle rotation speed is lower than or equal to a predetermined value and a condition that an amount of decrease in the idle rotation speed from the target rotation speed is smaller than or equal to a predetermined amount.

5. The control device according to claim 4, wherein
the controller is configured to limit the idle speed control only when all the four conditions in the second condition are satisfied.

6. The control device according to claim 4, wherein
the controller is configured to reduce the control amount of the idle speed control as the number of satisfied conditions among the four conditions in the second condition increases.

* * * * *